United States Patent [19]

Cheselka et al.

[11] Patent Number: 4,787,025
[45] Date of Patent: Nov. 22, 1988

[54] REMOTE FAN OUT FACILITY FOR DATA TERMINALS

[75] Inventors: Harry Cheselka, Saugerties; Gerald J. Hladik; Chris Karabatsos, both of Kingston; Lawrence G. Mosher, Rhinebeck; Richard M. Morrison, Lake Katrine, all of N.Y.

[73] Assignee: International Business Machines Corporation, Armonk, N.Y.

[21] Appl. No.: 154,527

[22] Filed: Feb. 5, 1988

Related U.S. Application Data

[63] Continuation of Ser. No. 586,659, Mar. 6, 1984, abandoned.

[51] Int. Cl.⁴ ............................................. G06F 3/00
[52] U.S. Cl. .................................... 364/200; 364/900
[58] Field of Search .................... 364/200, 900; 370/92

[56] References Cited

U.S. PATENT DOCUMENTS

| | | | |
|---|---|---|---|
| 3,772,656 | 11/1973 | Serracchioli | 364/200 |
| 3,996,564 | 12/1976 | Kerrigan et al. | 364/200 |
| 4,016,548 | 4/1977 | Law et al. | 364/200 |
| 4,062,059 | 12/1977 | Suzuki et al. | 364/200 |
| 4,075,691 | 2/1978 | Davis et al. | 364/200 |
| 4,124,889 | 11/1978 | Kaufman et al. | 364/200 |
| 4,200,930 | 4/1980 | Rawlings et al. | 364/200 |
| 4,264,954 | 4/1981 | Briggs et al. | 364/200 |
| 4,271,479 | 6/1981 | Cheselka et al. | 364/900 |
| 4,281,315 | 7/1981 | Bauer et al. | 364/200 |
| 4,348,720 | 9/1982 | Blahut et al. | 364/200 |
| 4,354,229 | 10/1982 | Davis et al. | 364/200 |

OTHER PUBLICATIONS

IBM Technical Disclosure Bulletin, Nov. 1975, vol. 18, No. 6, pp. 1955–1957.
IBM Product Announcement, Mar. 8, 1983.

*Primary Examiner*—David Y. Eng
*Attorney, Agent, or Firm*—J. A. Kunkle; F. D. Poag

[57] ABSTRACT

A remote fan out facility used in an information handling system including a plurality of data terminals located remotely from a central processor unit. Messages transmitted from the central processing unit to one of the plurality of data terminals are modified by creating and inserting a terminal device address into the outbound messages. The messages are then transmitted to a fan out box located near the addressed terminal. The fan out box strips the terminal address from the received message, decodes the stripped address, and directs the message to the appropriate data terminal according to the stripped decoded address. By this means, a single serial transmission link can be used to connect the central processing unit to a plurality of data terminals without undue modification of an existing system.

4 Claims, 3 Drawing Sheets

REMOTE FAN OUT FACILITY FOR DATA TERMINALS

This is a continuation of application Ser. No. 568,659, filed Mar. 6, 1984, now abandoned.

DESCRIPTION

1. Technical Field

The invention relates to communication links for information handling systems having data display terminals located remote from a central processing unit.

2. Background of the Invention

Known information handling systems typically use one or more host processors in conjunction with several remotely located data terminals. System operators enter data or commands from the terminals which are then transmitted to the host processor for processing. Results to be displayed or commands are transmitted from the host back to the display terminals. In addition, terminals may provide only a display function, for example, printing. These information handling systems often include several display control processors with each processor dedicated to manage the flow of data between the central processing unit and a group of display terminals. One such information handling system is shown in U.S. Pat. No. 4,271,479 which discloses an information handling system having a display control processor used to control a plurality of display terminals. The patent uses a display cluster adapter (DCA) to route messages from the control processor to one of thirty-two transmission lines driven by the driver/receiver module associated with the DCA. If the displays are located at a distance from the DCA, the cabling costs for such a system increase. In addition, existing building conduit systems often will not accommodate large numbers of cables making such a system impractical in many situations.

One possible solution is to multiplex the signals passing from the driver/receiver to the terminals over a single cable. One implementation of this solution is disclosed in IBM Technical Disclosure Bulletin, "Controller Attachment to Space and Time Separated Displays", November 1975, at 1955-56. The solution proposed there is to create unique frequency tones which represent respective line and display station addresses. The frequency tone is transmitted with or before the data signal over a single coaxial cable. Each terminal connected to the single cable contains a frequency selective filter tuned to receive one of the unique frequency tones. When that tone is detected, the terminal passes the data signal accompanying or following the frequency tone to the display associated with that terminal. This solution requires the addition of several analog circuit elements to the existing digital circuitry. Also, the interconnecting cable must be of sufficient bandwidth to pass the digital signals as well as a unique frequency tone for each of the display terminals connected to the cable. It would be highly desirable to use only digital circuitry in order to maintain compatibility with the existing digital circuitry and transmission links.

SUMMARY OF THE INVENTION

The present invention solves the aforementioned problems by providing a simple fan out box facility that adapts easily to existing circuitry while greatly reducing cabling costs and space required for cable runs.

The invention uses digital information provided by the display cluster adapter to construct a digital address byte which is appended to the front of outbound data messages. The appended address byte contains the address of the display terminal to which the data is being sent. The data, preceded by the address byte, is then transmitted to a remote fan out box which strips the address byte from the data, decodes the stripped address byte, and directs the data to the proper terminal according to the decoded address byte. Since each message transmitted from the driver/receiver module associated with the DCA has a unique address byte associated therewith, it is possible to use only a single transmission cable to serve a plurality of display terminals rather than using a cable dedicated to each terminal.

The display cluster adapter need not be changed in order to incorporate the fan out box facility as the concentration of the messages intended for a plurality of display terminals onto a single transmission cable is transparent to the DCA. The DCA provides the same output signals to the driver/receiver module for both single cable transmission and plural cable transmission. Signals provided by the DCA, that are normally used by the driver/receiver module to select one of a plurality of cables for transmitting the message, instead are used by the driver/receiver module to construct the address byte which is then appended to the front of the message to be transmitted over a single cable.

In addition, messages can be sent to any display terminal in any order because the address bytes are appended to the outbound data messages on the fly. Also, use of the fan out box facility effectively doubles the distance that data terminals can be located from the DCA. The driver/receiver circuits in the DCA are capable of transmitting messages over a first distance to the fan out box. The fan out box also contains similar driver/receiver circuits that are capable of transmitting messages a second distance which is substantially equal to the first distance.

Therefore, a primary object of this invention is to provide an improved information handling system with a simple fan out box facility for transmitting messages, intended for a plurality of terminal devies, over a single transmission link.

It is a related object of the invention to provide an information handling system wherein messages from a DCA to display terminals are concentrated onto a single transmission cable and are separated by a fan out box located remote from the DCA and near the display terminals.

Another object of the invention is to provide a remote fan out facility for inserting device addresses into messages transmitted from a DCA over a single cable to a receiver for decoding the inserted addresses and for directing the received messages according to the received decoded addresses.

Yet another object of the invention is to provide a remote fan out box for receiving, decoding, and distributing messages having display terminal addresses inserted therein.

DETAILED DESCRIPTION

Figure 1:
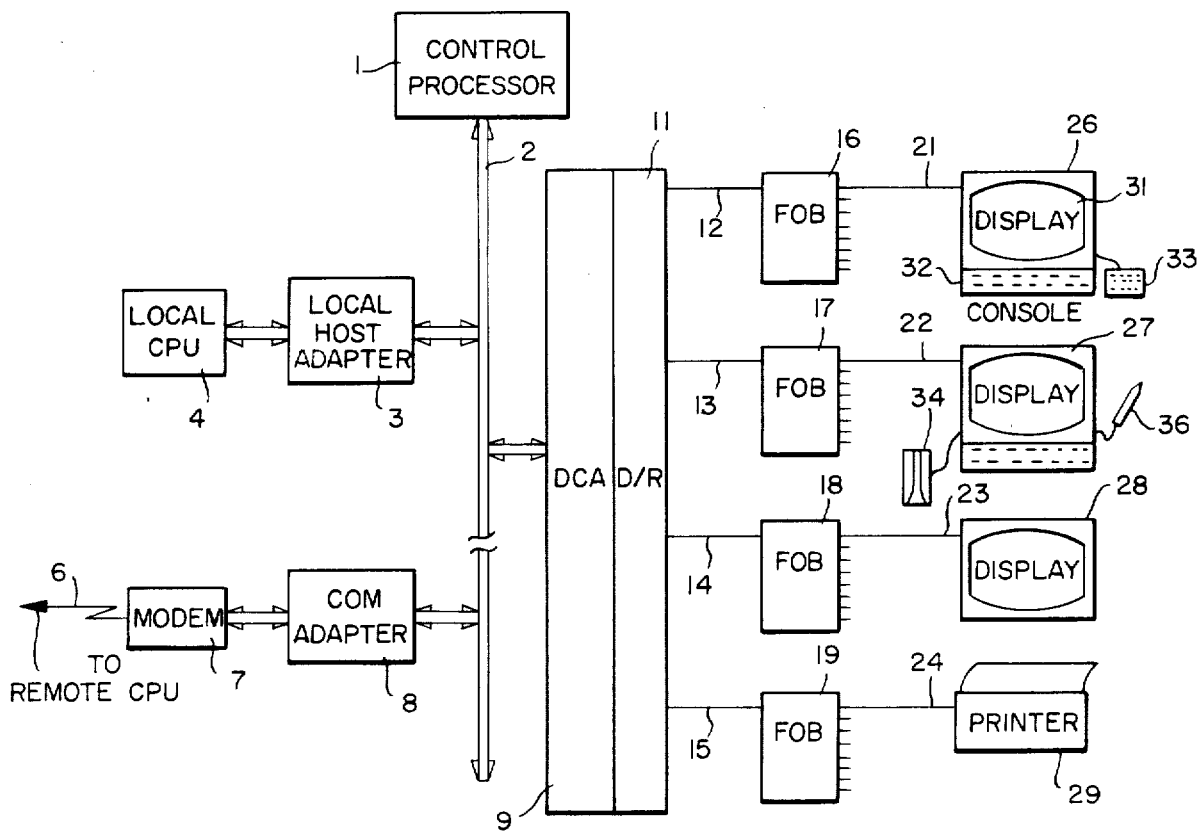
FIG. 1 is an information handling system according to this invention.

Referring to the improved information handling system shown in FIG. 1, a display control processor 1 is connected to input/output bus 2. I/O bus 2 is connected to local host adapter 3 which, in turn, is connected to central processing unit (CPU) 4. A remote CPU (not shown) can be connected to bus 2 through communications line 6, modem 7, and communications adapter 8. Either the remote CPU or local CPU 4 or both can act as host providing application and program directions to processor 1 as is well known in the art. Bus 2 carries data signals, as well as control signals, between the central processing units and processor 1.

For supporting the I/O devices in accordance with this invention, display cluster adapter (DCA) 9 is connected for communicating with bus 2 in order to control the transmission of the messages between processor 1 and driver/receiver module 11. Module 11 supports a group of serial transmission links such as coaxial cables 12-15 each of which provides two-way communication with a respective fan out box (FOB) 16-19. For this purpose, module 11 contains an individual driver/receiver circuit for each line 12-15 as will be described hereinafter. Each fan out box 16-19 supports a group of serial transmission links, such as coaxial cables 21-24, each providing two-way communication with a respective input, output, or input/output device. For this purpose, each fan out box 16-19 contains an individual driver/receiver circuit for each line 21-24.

Although driver/receiver module 11 is shown with four I/O lines and each fan out box 16-19 is shown with eight I/O lines, it will be understood by those skilled in the art that these numbers are given by way of example only, and will not be construed to limit the invention in any manner.

Two keyboard display stations 26, 27, a display-only station 28, and a printer 29 are shown as representative data terminal devices for inclusion in the information handling system. Station 26 operates as a system console and, like keyboard display station 27, includes a cathode ray tube 31 and keyboard 32. The displays and printer 29 serve to output information from the system and the keyboards serve to input information and operator direction into the system. Other information and control inputting devices, such as a program function keyboard 33, magnetic strip card reader 34, and light pen 36 provide data input and control to the system in addition to, or in lieu of keyboard 32.

In prior systems, for example, the system disclosed in U.S. Pat. No. 4,271,479, the DCA acts as a poller/multiplexer to select one of thirty-two I/O lines attached to the driver/receiver module of the DCA. In these prior systems, each of the thirty-two I/O lines must travel the full distance to the respective I/O device. The DCA selects one of four D/R cards within the D/R module and selects one of eight lines from that D/R card to carry the message. This typically is accomplished by using a five-bit device address register located within the DCA which contains two high-order bits used as card select bits and three low-order bits used as line select or device address bits. As is described with reference to FIG. 3, it is possible, according to the present invention, to modify the driver/receiver module without modifying the DCA itself to accomplish the improved information handling system. The modified driver/receiver module 11 uses the preexisting device address register within DCA 9 to construct an eight bit address byte which is inserted into all outbound messages just before the outbound information word.

Figure 2:
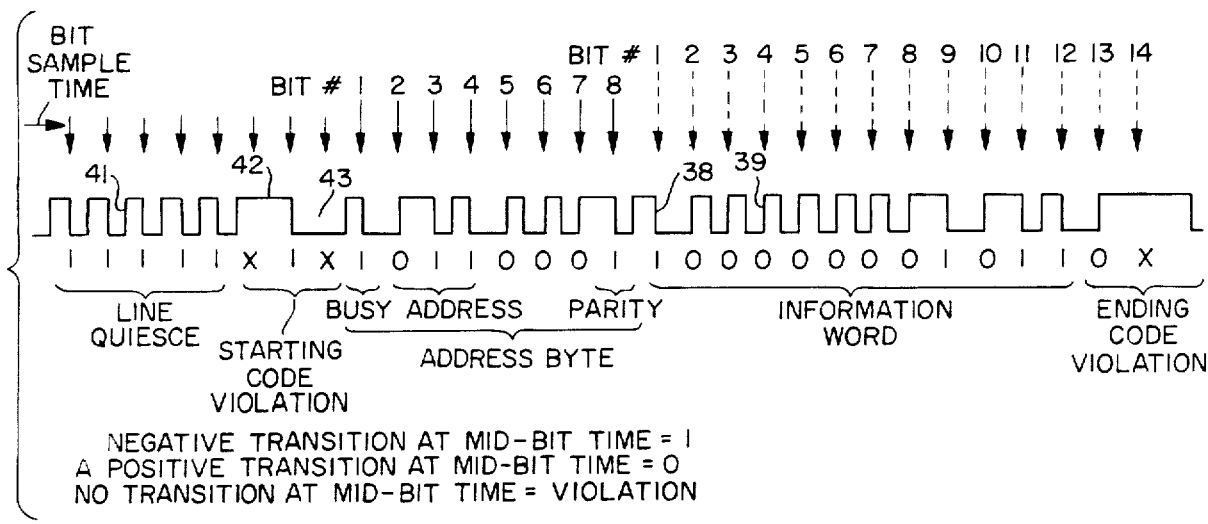
FIG. 2 is a timing chart of the data signal passed from the display cluster adapter to the fan out boxes of FIG. 1.

An example of a data signal passing from driver/receiver 11 to fan out boxes 16-19 over lines 12-15, respectively, is shown in FIG. 2. The outbound signal comprises an eight-bit start sequence, an eight-bit address byte, and one or more twelve-bit information words. The information words accommodate all commands and data transmission between display devices 26-29 and the rest of the information handling system.

As shown in FIG. 2, a transition at mid-bit signifies a valid bit, a negative going transition such as at transition 38 signifying a valid "1" and a positive going transition such as at transition 39 signifying a "0". The start sequence comprises a plurality of line quiescense pulses 41 followed by a starting code violation recognized by the fact that there is no mid-bit transition during the times shown at 42, 43. Between these code violations, there is a transition indicative of a "1" and following this violation, there is a busy bit which is another indication of a "1". The busy bit signifies bit #1 of a transmitted byte, in this case, the address byte. Bits #2-4 of the address byte are the device address to which the message is being sent. Bits #5-7 are not used in this example and are arbitrarily set to "0". Bit #8 of the address byte is the parity bit and is shown set to "1".

Following the address byte is a twelve bit information word beginning with a busy bit in bit position #1. Bit time #13 signifies the beginning of an ending code violation. The example shown indicates a "0" in bit position #13 which signifies the end of the data transmission. If bit #13 were a "1", an additional twelve bit information word would follow immediately thereafter.

It should be noted that the address byte is present only in messages being transmitted from driver/receiver module 11 to fan out boxes 16-19. Data messages transmitted back and forth between fan out boxes 16-19 and terminals 26-29 do not contain address bytes and take the form of a start sequence followed immediately by an information word or words followed by an ending code violation. In a like manner, messages transmitted from fan out boxes 16-19 back to driver/receiver module 11 do not contain address bytes. This is because any messages transmitted from the terminals through the fan out boxes to driver/receiver module 11 are in response to a poll request or other command which had been sent to a specific terminal. Therefore, any message received by driver/receiver 11 in response to the command must come from the addressed terminal. This operation will be described in more detail below.

Figure 3:
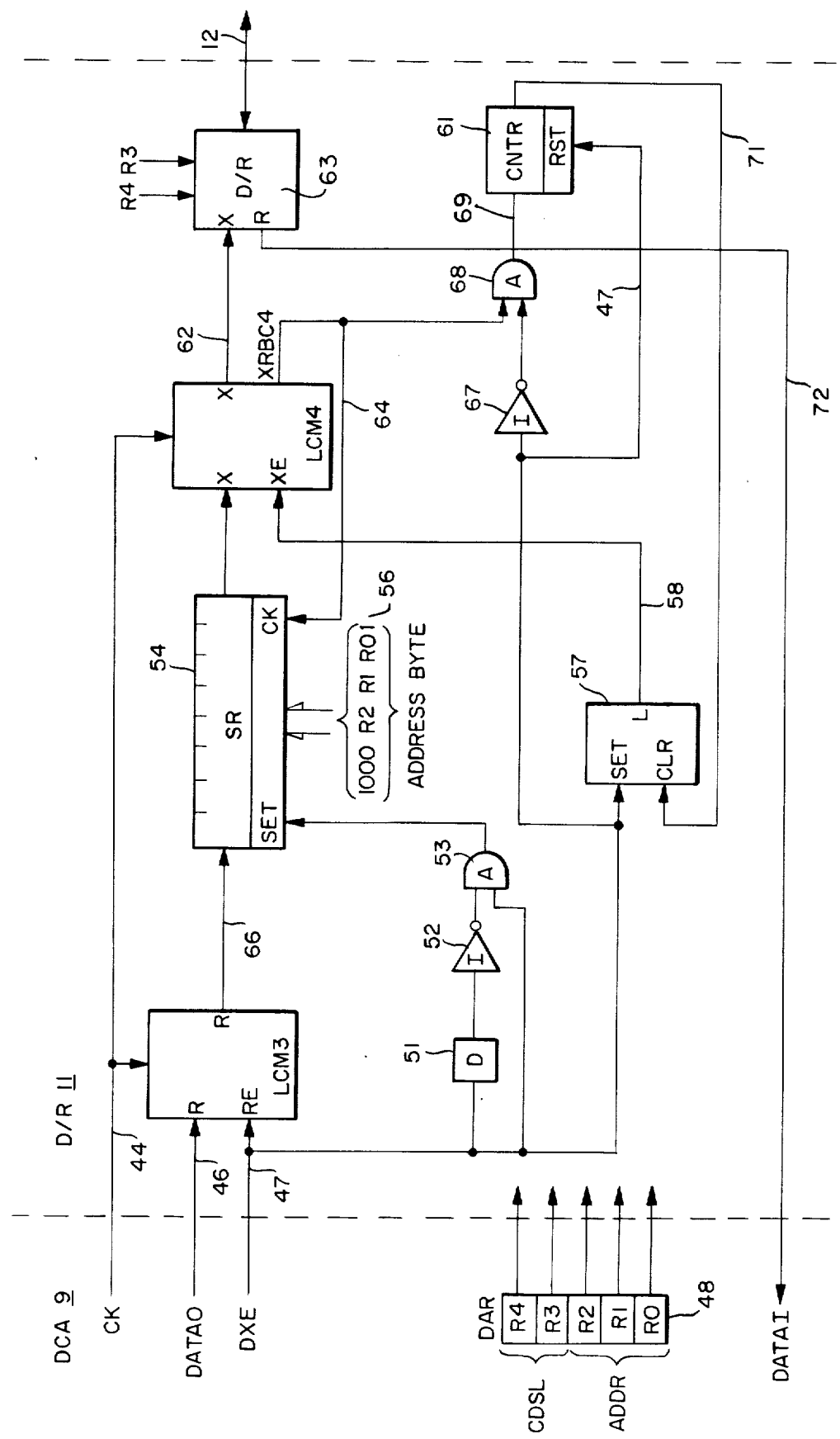
FIG. 3 is a schematic of the display cluster adapter and the driver/receiver module of FIG. 1.

The circuit that inserts the address bit into outbound messages is shown in FIG. 3. Display cluster adapter 9 generates several signals which are connected to driver/receiver module 11 including clock signal (CK) on line 44, output data (DATO) on line 46, and a delayed transmit enable signal (DXE) on line 47. In addition, DCA 9 includes a five-bit device address register (DAR) 48. The two high-order bits (R3, R4) in register 48 are the card select bits and the three low-order bits (R0, R1, R2) are the device address bits. In prior systems, the card select bits were used to choose between one of four possible driver/receiver cards, and the device address bits were used to select one of eight I/O drivers on the selected card. Register 48 is typically loaded by processor 1 using bus 2 both shown in FIG. 1. The preferred embodiment of the present invention again uses the two high-order bits of register 48 to select one of four driver/receiver cards within driver/receiver module 11. One such driver/receiver card is shown in FIG. 3. However, the low-order device address bits are used by driver/receiver module 11 to construct the aforementioned eight-bit address byte which is then inserted into the outbound message.

Signal DXE moves from a low state to a high state when a message is ready to be transmitted from DCA 9. Signal DXE activates line control module LCM3 by activating the receive enable (RE) input of module LCM3. In addition, sgnal DXE passes through delay block 51, inverter 52 and is ANDed with undelayed signal DXE by AND gate 53 to produce a pulse signal coincident with the rising edge of signal DXE. The pulse signal loads shift register 54 broadside with address byte 56 which includes the three low-order bits taken from register 48. In addition, the rising edge of signal DXE sets latch 57 which causes line 58 to move from a low state and latch in a high state. This in turn places line control module LCM4 in a transmit mode by activating the transmit enable (XE) input of module LCM4. Also, signal DXE resets counter 61 to a zero count.

When line control module LCM3 is placed in the receive mode by signal DXE, module LCM3 begins monitoring line 46 for the aforementioned eight-bit start sequence. This start sequence is generated by a line control module (not shown) located on DCA 9 which is transmitting data on line 46 at a rate determined by clock signal CK on line 44. Also, upon being activated by the transmit enable signal on line 58, line control module LCM4 begins transmitting an internally generated start sequence on line 62 which is passed by driver/receiver circuit 63 onto I/O line 12. Driver/receiver circuit 63 is activated by the two high-order bits, or card select bits, from register 48.

When module LCM4 finishes generating the eight-bit start sequence, module LCM4 begins generating transmit/receive bit clock signal XRBC4 on line 64. Signal XRBC4 is derived from clock signal CK on line 44. Since line control modules LCM3 and LCM4 are driven from the same clock signal on line 44 (which also drives the line control module driving line 46), module LCM3 stops receiving a start sequence at the same time module LCM4 stops transmitting a start sequence. At this time, clock signal XRBC4 begins shifting shift register 54 from left to right one bit each clock cycle. Data received on line 46 by module LCM3 is then transferred to line 66 and shifted into shift register 54 from the left. Data shifted out of the right of shift register 54 is transferred by module LCM4 to driver/receiver circuit 63 and onto I/O line 12. By this means, I/O line 12 carries a start sequence followed by an address byte 56 followed by an information word or words transmitted from DCA 9 to driver/receiver module 11 on line 46.

When DCA 9 is finished transmitting to driver/receiver module 11, an internally generated transmit enable signal (not shown) on DCA 9 is moved from a high state to a low state. After five clock pulses, delayed transmit enable signal DXE also moves from a high state to a low state. After this five clock pulse delay, the last three bits of the information word being transmitted occupy the rightmost three bit positions of shift register 54. Also, a "0" bit occupies the fourth bit position from the right in shift register 54 indicating an end of transmission in accordance with the signal shown in FIG. 2. Signal DXE moving from a high state to a low state is inverted by inverter 67 which activates AND gate 68 to pass clock signal XRBC4 from line 64 to line 69. Counter 61 is set to count four pulses on line 69 and to produce a pulse on line 71 at the end of the count. The rising edge of the pulse on line 71 clears latch 57 which forces line 58 from a high state to a low state thereby disabling line control module LCM4 and stopping signal XRBC4. The four extra clock pulses of XRBC4 allowed by counter 61 serve to clock the remaining four bits from left to right out of shift register 54 through module LCM4, driver receiver circuit 63, and out onto I/O line 12.

When a response message is received on line 12 from the respective fan out box, driver receiver circuit 63 is still active by application of signals R4 and R3, and the information word received on line 12, preceded by the start sequence, is passed by driver/receiver circuit 63 onto line 72 and back to DCA 9 as the data input signal (DATAI). It should be noted that response messages received by driver/receiver module 11 will not have address bytes included therein and will take the form of a start sequence followed immediately by an information word.

Figure 4:
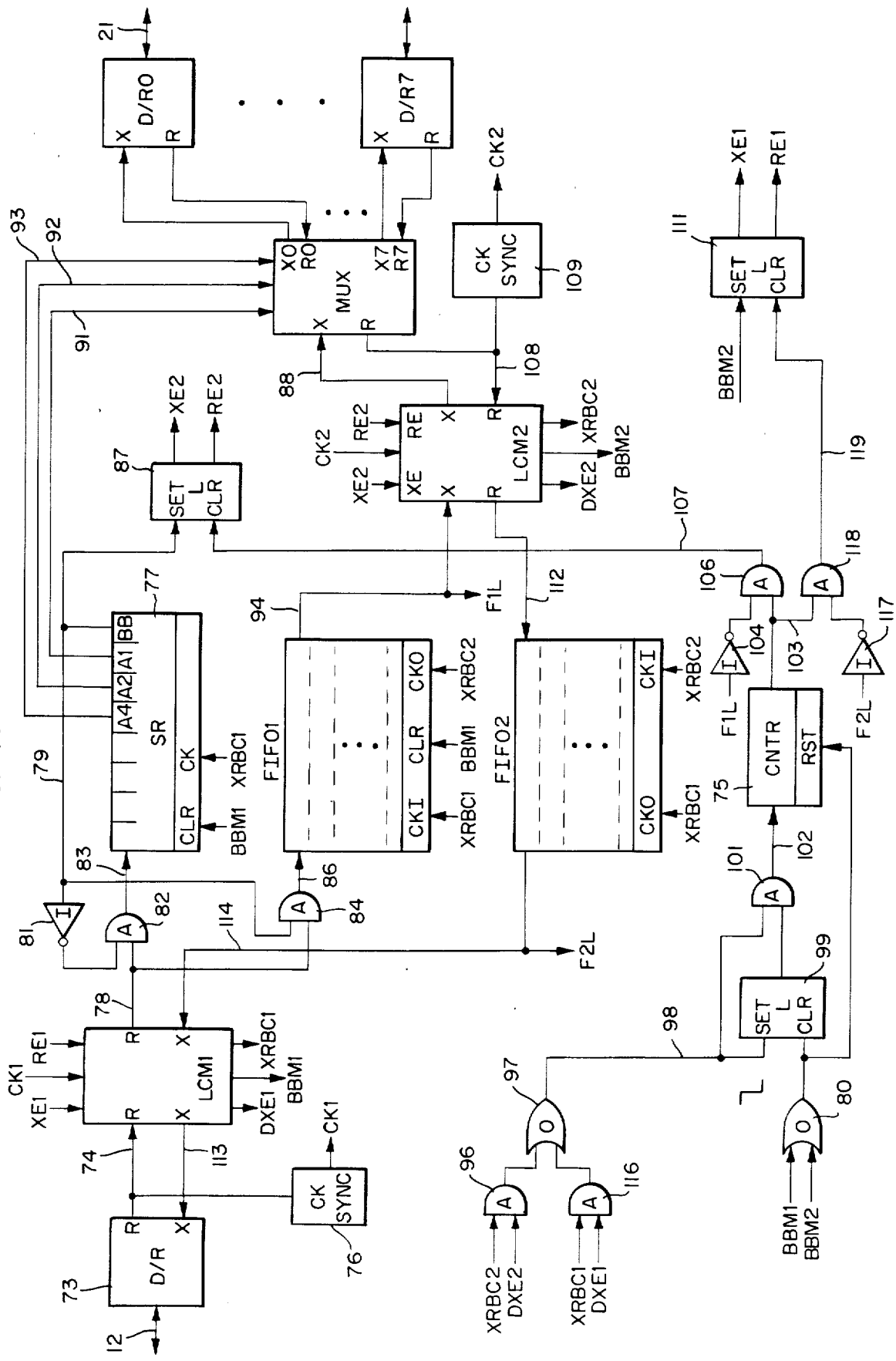
FIG. 4 is a schematic of a fan out box shown in FIG. 1.

FIG. 4 illustrates a schematic of fan out box 16 shown in FIG. 1 and is representative of the schematics of all fan out boxes 16-19 of FIG. 1. Data signals are received on I/O line 12 from driver/receiver module 11 (shown in FIGS. 3 and 1). Driver/receiver circuit 73 receives signals on line 12 and passes them to line control module LCM1 on line 74. In addition, clock synchronize circuit 76 synchronizes clock signal CK1 with the incoming data so that module LCM1 is also synchronized with the incoming data. Initially, receive enable signal RE1 is in a high state placing module LCM1 in a receive mode sensing data on line 74.

Line control module LCM1 is similar to module LCM3 and LCM4 shown in FIG. 3 and, when in the receive mode, senses line 74 for the eight bit start sequence. Line control modules illustrated herein are similar to module COM9004 manufactured by Standard Micro Systems, Inc. and are compatible with the International Business Machines System 3274 communications protocol. At the end of the start sequence detected by module LCM1, several events occur simultaneously. LCM1 pulses busy bit marker signal BBM1 which clears shift register 77, first-in, first-out buffer FIFO1 and resets counter 75 through OR gate 80. Also, at the end of the start sequence, module LCM1 begins transferring data from line 74 to line 78. In addition, at the end of the detected start sequence, module LCM1 begins producing transmit/receive bit clock signal XRBC1 which is derived from clock signal CK1.

Since the data received on line 12 is similar to that shown in FIG. 2, the first data appearing on line 78 is the address byte. Because register 77 is initially set to all zeroes by signal BBM1, a "0" appears on line 79. The signal on line 79 is inverted by inverter 81 which satisfies AND gate 82 which, in turn, passes data from line 78 to line 83. The data on line 83 is clocked into shift register 77 at a clock rate determined by signal XRBC1. The zero on line 79 prevents AND gate 84 from passing data from line 78 to line 86 and into FIFO1.

At the end of eight clock pulses of signal XRBC1, the eight-bit address byte occupies all eight bits of shift register 77. The busy bit of the address byte (see FIG. 2) occupies the rightmost position of register 77 and this changes line 79 from a "0" to a "1". This change disables AND gate 82 and enables AND gate 84, thereby clocking data following the address byte from line 78 through AND gate 84 to line 86 and into first-in, first-out buffer FIFO1 at clock rate XRBC1.

When the busy bit of the address byte causes line 79 to move from a "0" to a "1", latch 87 is set producing a "1" for transmit enable signal XE2. Signal XE2 places line control module LCM2 in the transmit mode and module LCM2 begins generating and transmitting the start sequence onto line 88.

Line 88 feeds multiplexer MUX which is controlled by address bits A1, A2, and A4 via lines 91-93, respectively, connected to shift register 77. Multiplexer MUX transfers data from line 88 to driver/receiver circuits D/R0-D/R7 depending on the values of address bits A1, A2 and A4. For example, if A1, A2, A4 equals 000, D/R0 would be selected, if A1, A2, A4 equals 111, D/R7 would be selected, and so forth.

At the end of the eight-bit time for generating and transmitting the start sequence, module LCM2 begins producing transmit/receive bit clock signal XRBC2 derived from clock signal CK2. Signal XRBC2 begins clocking data out of buffer FIFO1 onto line 94 through LCM2 and onto line 88.

Both buffers FIFO1 ad FIFO2 are first-in, first-out sixteen bit buffers that allow data to be clocked in at a first rate CKI and clocked out at a second rate CKO. Buffers FIFO1 and FIFO2 can be, for example, type 74S225 TTL integrated circuits. As module LCM2 is generating and transmitting the eight-bit start sequence, module LCM1 is clocking data into buffer FIFO1 at clock rate XRBC1. When module LCM2 finishes transmitting the start sequence, module LCM2 begins clocking data out of data buffer FIFO1 at clock rate XRBC2.

Module LCM2 produces delayed transmit enable signal DXE2 substantially simultaneous with the application of transmit enable signal XE2 from latch 87. Signal DXE2 is applied with signal XRBC2 to AND gate 96 which, in turn, passes signal XRBC2 through OR gate 97 to line 98. The falling edge of the first pulse of signal XRBC2 on line 98 sets latch 99 which, in turn, satisfies AND gate 101. By this means, all pulses of clock signal XRBC2, except the very first pulse, appear on line 102 subsequent to the transition of signal DXE2 from a "0" to a "1".

Counter 75 counts twelve pulses on line 102 and then produces a transition from a low state to a high state on line 103. The pulse on line 103 is coincident with bit position #13 of the information word (shown in FIG. 2) appearing in the last bit position F1L of buffer FIFO1. If bit position #13 is a "1", indicating that another information word is following, signal F1L will be a "1" and the output of inverter 104 will be a "0" thereby disabling AND gate 106 and preventing a pulse from passing through to line 107. The next pulse on line 102 will then force counter 75 to roll-over to a count of zero thereby causing line 103 to return to a zero level and causing the twelve count to start anew. However, if bit position #13 is a "0", signal F1L will be a "0" and the output of inverter 104 will be a "1". This will satisfy AND gate 106 allowing the pulse appearing on line 103 to pass to line 107 thereby clearing latch 87. Clearing latch 87 forces signal XE2 to move from a high state to a low state and signal RE2 to move from a low state to a high state. This transition of latch 87 places line control module LCM2 in the receive mode and module LCM2 begins monitoring line 108 for a start sequence. In addition, placing module LCM2 in the receive mode stops clock signal XRBC2 thereby interrupting the flow of pulses to counter 75 which causes line 103 to remain in a high state.

By the above described operation, the fan out box shown in FIG. 4 has received a message including an address byte on line 12, has stripped that address byte from the message and placed the address byte in register 77, has decoded the stripped address byte by using the MUX, and has directed the message to the proper output port (e.g., line 21) according to the decoded address byte. As mentioned above, at the end of this operation, module LCM2 is in the receive mode monitoring line 108 for the start sequence.

When the addressed display terminal (e.g., terminal 26 in FIG. 1) sends a response message, for example, on line 21, the message takes the form of a start sequence followed immediately by an information word without an address byte inserted therebetween. The response message must come from the same terminal to which the original message was sent because shift register 77 still contains the address byte associated with the original message. Address bits A1, A2, and A4 still control multiplexer MUX which connects the proper driver/receiver circuit to line control module LCM2 through line 108.

When a start sequence appears on line 108, clock synchronize circuit 109 performs a function similar to synchronize circuit 76 and synchronizes clock signal CK2 with the incoming data so that module LCM2 is also synchronized with the incoming data. After receiving the start sequence, module LCM2 detects a busy bit as the first bit of the incoming information word. By the internal operation of module LCM2, detection of busy bit causes clock signal XRBC2 to start, and causes a pulse busy bit marker signal BBM2. Signal BBM2 sets latch 111 which causes transmit enable signal XE1 to move from a low state to a high state and causes receive enable signal RE1 to move from a high state to a low state. This transition of latch 111 places module LCM1 in the transmit mode. In addition, pulse signal BBM2 clears counter 75 through OR gate 80 and also clears latch 99. Also, at the end of the detected start sequence, module LCM2 begins transferring data from line 108 to line 112. Clock signal XRBC2 then begins clocking data on line 112 (the information word of the response message) into buffer FIFO2.

When line control module LCM1 is placed in the transmit mode by latch 111, module LCM1 begins generating and transmitting the eight bit start sequence on line 113 which is passed by driver/receiver circuit 73 onto coaxial cable 12. At the end of the start sequence generation, module LCM1 begins generating clock signal XRBC1. Signal XRBC1 is supplied to clock data out of buffer FIFO2 onto line 114 through module LCM1, driver/receiver circuit 73, and onto coaxial cable 12. In addition, signal XRBC1 is applied to AND gate 116 along with signal DXE1, signal DXE1 having gone from a low state to a high state, under control of module LCM1, substantially simultaneous with the application of signal XE1 to module LCM1. AND gate 116, OR gate 97, latch 99, and AND gate 101 then function together to produce clock signal XRBC1 on line 102 missing the first pulse. Once again, counter 75 counts twelve pulses at which point line 103 moves from a low state to a high state. At this point, the last position F2L of buffer FIFO2 is checked by inverter 117 and AND gate 118. If bit position F2L is a "1", AND gate 118 will not be satisfied and no pulse will appear on line 119, thereby leaving latch 111 in its present state. However, if bit position F2L is a "0" indicating the last information word of the message, AND gate 118 is satisfied causing line 119 to move from a low state to a high state thereby clearing latch 111 and causing signal XE1 to move from a high state to a low state and causing signal RE1 to move from a low state to a high state. This transition of latch 111 places line control module LCM1 in the receive mode awaiting further transmission from the rest of the system over coaxial cable 12.

By the above described operation, the fan out box shown in FIG. 4 has received a response message on line 21 and has passed that response message, preceded by a start sequence, onto line 12. At the end of this operation, module LCM1 is in the receive mode monitoring line 74 for a start sequence.

It should be noted that modifications may be made to the circuits shown in FIGS. 3 and 4 without departing from the intended scope of the invention. For example, FIFO1 and FIFO2 may be replaced by shift registers or other similar devices. The preferred embodiment herein presented is for illustrative purposes and, as such, will not be construed to place limitations on the invention. Those skilled in the art will understand that changes may be made in the form and detail of the preferred embodiment without departing from the spirit and scope of the invention.

We claim:

1. A remote fan out box facility, having transmitting means for transmitting digital messages and a plurality of data terminal means for receiving digital messages, comprising:

means, within said transmitting means, for creating a terminal address for each outbound data message and for inserting said address into a respective outbound data message to create a complete message having an address section and data section;

a first serial transmission means, having a first terminus connected to said transmitting means, for carrying said complete messages; and a remote fan out box, connected to a second terminus of said first serial transmission means, for receiving said complete messages, said remote fan out box including means for reading said address section of each said complete message into a shift register;

said shift register having a particular number of positions wherein the rightmost position of said shift register detects the final bit of the address section being read into said shift register and activates a logic gate;

said logic gate directing the data section of said complete message into a first FIFO buffer;

said remote fan out box also including a decoder connected to particular positions of said shift register for reading said address section and said decoder also connected to multiple second serial data lines with each of said second serial data lines connected to a separate data terminal;

said decoder also logically connected to the output line of said first FIFO buffer;

said decoder logically connecting the output line of said first FIFO buffer to one of said second serial data lines dependent on the address section in said shift register for directing the data section of said complete message received by said fan out box to a particular data terminal.

2. A remote fan out box as recited in claim 1 wherein said decoder includes a multiplexer.

3. A remote fan out box as recited in claim 1 further comprising a means for receiving a data terminal response message serially transmitted over said second serial data line from said respective data terminal and means for transmitting said response message to said utilization device over said first serial transmission means.

4. A remote fan out box as in claim 3 wherein said means for receiving a data terminal response message includes a second FIFO.

* * * * *